3,230,142
ORAL CONTRACEPTIVE COMPOSITIONS AND METHODS

George B. Spero, Kalamazoo, Mich., assignor to The Upjohn Company, Kalamazoo, Mich., a corporation of Delaware
No Drawing. Filed Mar. 25, 1963, Ser. No. 267,773
6 Claims. (Cl. 167—55)

This invention relates to pharmaceutical preparations and more particularly to pharmaceutical preparations containing 6α-methyl-17α-hydroxyprogesterone 17 - acetate and ethinyl estradiol. It also relates to processes for the administration thereof to ovulating mammals and birds.

The present application is a continuation-in-part of application Serial No. 39,333, filed June 28, 1960, which is a continuation-in-part of applications Serial No. 832,909, filed August 11, 1959, now abandoned, and Serial No. 685,391, filed September 23, 1957.

6α-methyl-17α-hydroxyprogesterone 17 - acetate is prepared according to the processes in application Serial No. 685,391.

The invention provides novel and useful pharmaceutical preparations comprising 6α-methyl-17α-hydroxyprogesterone 17-acetate and ethinyl estradiol and suitably an oral pharmaceutical carrier. The invention also provides novel and useful processes of administration thereof to ovulating mammals and birds.

As used in the specification and claims of this application, oral pharmaceutical carrier includes solid oral carriers, as used in capsules, pills, pilules, and tablets, and liquid oral carriers, as used in elixirs, solutions, suspensions and syrups.

Oral carriers suited for compounding solid preparations comprise ingestible disintegrators lubricants, diluents, binders, flavors, and the like. Oral carriers suited for compounding liquid preparations comprise purified water, U.S.P., ingestible oils, glycols, colors, flavors, sweetening agents, suspending agents, surfactants, preservatives alcohols and the like.

It is especially advantageous to compound solid and liquid unitary dosage forms for ease and economy of administration and uniformity of dosage. Unitary dosage form as used in the specification and claims herein refers to physically discrete forms suitable as unitary dosages for animal, human and bird subjects, each form containing predetermined quantities of the active ingredients calculated to produce the desired therapeutic effect in association with a major amount of an oral pharmaceutical carrier. The specifications for the novel unitary dosage forms of this invention are dictated by and directly dependent on (a) the unique characteristics of the active materials and the particular therapeutic effect to be achieved and (b) the limitations inherent in the art of compounding such active materials for administration to animal, human and bird subjects as disclosed in detail in this specification, these being features of the present invention. Examples of the unitary dosage forms heretofore described are a tablet, a capsule, a pill, and a pilule; a dropperful, a teaspoonful, and a tablespoonful; and segregated multiples thereof.

The inventive preparations are administered in varying dosages depending on the weight and condition of the mammals and birds under treatment, the route of administration, i.e., oral administration, and the nature of the desired results.

Solid oral preparations comprise from about 1 to about 10 mgs. of 6α-methyl-17α-hydroxyprogesterone 17-acetate, preferably from about 2.5 to about 10 mgs., and from about 0.01 to about 0.2 mg. of ethinyl estradiol. A ratio of the former ingredient to the latter ingredient of from 25:1 to 500:1 is preferred. Especially preferred is a unitary dosage form comprising about 10 mgs. of the 6α-methyl-17α-hydroxy-progesterone 17-acetate and about 0.05 mg. of ethinyl estradiol.

Liquid oral preparations for administration in teaspoonfuls (5 mls.) comprise from about 0.05 to about 0.2%, w./v., of 6α-methyl-17α-hydroxyprogesterone 17 - acetate and from about 0.0002 to about 0.004%, w./v., of ethinyl estradiol. Especially preferred is a unitary dosage form for teaspoonful use comprising about 0.2% and about 0.001%, w./v., respectively. For administration in drops, the preparations contain up to about 10%, w./v., of 6α-methyl-17α-hydroxyprogesterone 17 - acetate and up to about 0.01%, w./v., of ethinyl estradiol.

The compositions of the present invention are novel and useful pharmaceutical preparations demonstrating unexpected, advantageous and beneficial results in the treatment of ovulating mammals and birds, for example, to re-establish normal endometrium-ovary-anterior pituitary relationships, in forestalling habitual and threatened abortion, in easing pre-menstrual tension and preventing ovulation in humans.

In the prevention of ovulation in ovulating mammals, especially humans, the compositions and processes of the instant invention demonstrate especially beneficial and advantageous results, particularly in the area of lessened side effects, such as nausea, edema, break-through bleeding, thrombo-embolic afflictions, breast problems, weight gain, liver toxicity, virilization in the patient, and masculinization of a female fetus.

The following examples describe the manner and process of making and using the invention and set forth the best mode contemplated by the inventor of carrying out the invention but are not to be construed as limiting.

Example 1.—Oral tablet 50,000 tablets for oral adminstration are prepared from the following types and amounts of materials. Each tablet contains 3.0 mgs. of 6α-methyl-17α-hydroxyprogesterone 17-acetate and 0.03 mg. of ethinyl estradiol.

| | |
|---|---|
| 6α - methyl - 17α - hydroxyprogesterone 17 - acetate _____oz__ | 5 |
| Ethinyl estradiol _____grains__ | 23 |
| Lactose _____lbs__ | 3 |

The finely powdered active ingredients and lactose are mixed well and granlated with syrup-starch paste. Starch and calcium stearate are used as lubricants in the compressing step.

The oral administration of 1 tablet daily provides good results in the treatment of secondary amenorrhea in humans.

Example 2.—Oral tablet 10,000 tablets for oral administration are prepared from the following types and amounts of ingredients. Each tablet contains 10 mgs. of 6α-methyl-17α-hydroxyprogesterone 17-acetate and 0.05 mg. of ethinyl estradiol.

| | Gms. |
|---|---|
| 6α - methyl-17α - hydroxyprogesterone 17 - acetate _____ | 100 |
| Ethinyl estradiol _____ | 0.5 |
| Lactose _____ | 2600 |

The finely powdered active ingredients and lactose are mixed well and granulated with syrup-starch paste. Starch, talc, and calcium stearate are used as lubricants in the compresing step.

The oral administration of 1 tablet daily on days 5 through 24 of the human menstrual cycle is effective in preventing ovulation, with lessened side effects.

Example 3.—Oral aqueous suspension

An aqueous suspension for oral administration, containing in each teaspoonful (approximately 5 mls.) 5 mgs. of 6α-methyl-17α-hydroxyprogesterone 17-acetate and 0.2 mg. of ethinyl estradiol is prepared from the following types and amounts of ingredients:

6α - methyl - 17α - hydroxyprogesterone 17 - acetate _____ gm__ 1
Ethinyl estradiol _____ mgms__ 40
Preservative _____ gms__ 2
Flavor, q.s.
Purified water U.S.P., q.s. ad 1000 mls.

The preservative and flavor are dissolved in the water. The micronized active ingredients are added and the whole is homogenized.

A daily dose of 1 teaspoonful (5 mls.) gives good results in the treatment of menstrual disorders in humans.

Example 4.—Oral gelatin capsule 1000 gelatin capsules for oral administration, each containing 10 mgs. of 6α-methyl-17α-hydroxyprogesterone 17-acetate and 0.05 mg. of ethinyl estradiol are prepared from the following types and amounts of materials:

6α - methyl - 17α - hydroxyprogesterone 17 - acetate _____ gms__ 10
Ethinyl estradiol _____ mgms__ 50
Ingestible oil, q.s.

The micronized active ingredients and the oil are mixed and the mix is encapsulated by the usual techniques into gelatin capsules.

A daily dose of 1 capsule given on days 5 through 24 of the human menstrual cycle is beneficial in preventing ovulation.

Example 5.—Oral tablets

Following the procedure of Example 2, 5000 tablets are prepared from the following types and amounts of ingredients.

Each tablet:
    5 mgs. 6α-methyl-17α-hydroxyprogesterone 17-acetate _____ gms__ 25
    0.01 mg. ethinyl estradiol _____ mgs__ 50
    150 mgs. lactose _____ gms__ 750
    3 mgs. acacia _____ gms__ 15
    65 mgs. starch, bolted _____ gms__ 325
    3 mgs. calcium stearate _____ gms__ 15

Good results in the inhibition of ovulation in humans are obtained at a daily dosage of 1 tablet orally.

Tablets equally suited for the inhibition of ovulation are prepared by using 250 and 1000 mgs., respectively, of the ethinyl estradiol in place of the 50 mgs. in the above formulation.

Example 6.—Oral aqueous suspension

Following the procedure of Example 3 but using 2 gms. of 6α-methyl-17α-hydroxyprogesterone 17-acetate and 10 mgs. of ethinyl estradiol an aqueous suspension containing, per 5 mls., 10 mgs. of the steroid acetate and 0.05 mg. of ethinyl estradiol is prepared.

Prevention of ovulation, with lessened side effects as aforesaid, is accomplished by a dosage regimen of 5 mls. per day, day 5 through 24 of the human menstrual cycle.

What is claimed is:

1. A solid pharmaceutical preparation comprising a major amount of a solid, oral pharmaceutical carrier, from about 1.0 to about 10 mg. of 6α-methyl-17α-hydroxyprogesterone 17-acetate, and from about 0.01 mg. to about 0.2 mg. of ethinyl estradiol.

2. An aqueous pharmaceutical suspension comprising a major amount of a liquid, oral pharmaceutical carrier, from about 0.05 percent to about 10 percent, weight/volume, of 6α-methyl-17α-hydroxyprogesterone 17-acetate and from about 0.0002 percent to about 0.01 percent, weight/volume, of ethinyl estradiol.

3. A pharmaceutical tablet comprising a major amount of a solid, oral pharmaceutical carrier, about 10 mg. of 6α-methyl-17α-hydroxyprogesterone 17-acetate, and about 0.05 mg. of ethinyl estradiol.

4. A method of preventing ovulation in ovulating mammals and birds which comprises the oral administration thereto of a solid pharmaceutical preparation comprising a major amount of a solid, oral pharmaceutical carrier, from about 1 mg. to about 10 mg. of 6α-methyl-17α-hydroxyprogesterone 17-acetate, and from about 0.01 mg. to about 0.2 mg. of ethinyl estradiol.

5. A method of preventing ovulation in ovulating mammals and birds which comprises the oral administration thereto of an aqueous pharmaceutical suspension comprising a major amount of a liquid, oral pharmaceutical carrier, from about 0.05% to about 10% w./v. of 6α-methyl-17α-hydroxyprogesterone 17-acetate, and from about 0.0002% to about 0.01% w./v. of ethinyl estradiol.

6. A method of preventing ovulation in ovulating humans which comprises the oral administration thereto of a pharmaceutical tablet comprising a major amount of a solid, oral pharmaceutical carrier, about 10 mg. of 6α-methyl-17α-hydroxyprogesterone 17-acetate and about 0.05 mg. of ethinyl estradiol.

References Cited by the Examiner

Physicians' Desk Reference (PDR), 12th ed. (1958), pp. 773 and 775, Medical Economics, Inc.; Oradell, New Jersey.

Unlisted Drugs, volume 1–2, page 100, September 30, 1950, Unlisted Drugs Committee of the Pharmaceutical Section, Technology Group, % E. R. Squibb and Sons, 25 Columbia Heights, Brooklyn 2, New York.

JULIAN S. LEVITT, *Primary Examiner*.

FANK CACCIAPAGLIA, JR., *Examiner*.

MARTIN J. COHEN, *Assistant Examiner*.